UNITED STATES PATENT OFFICE.

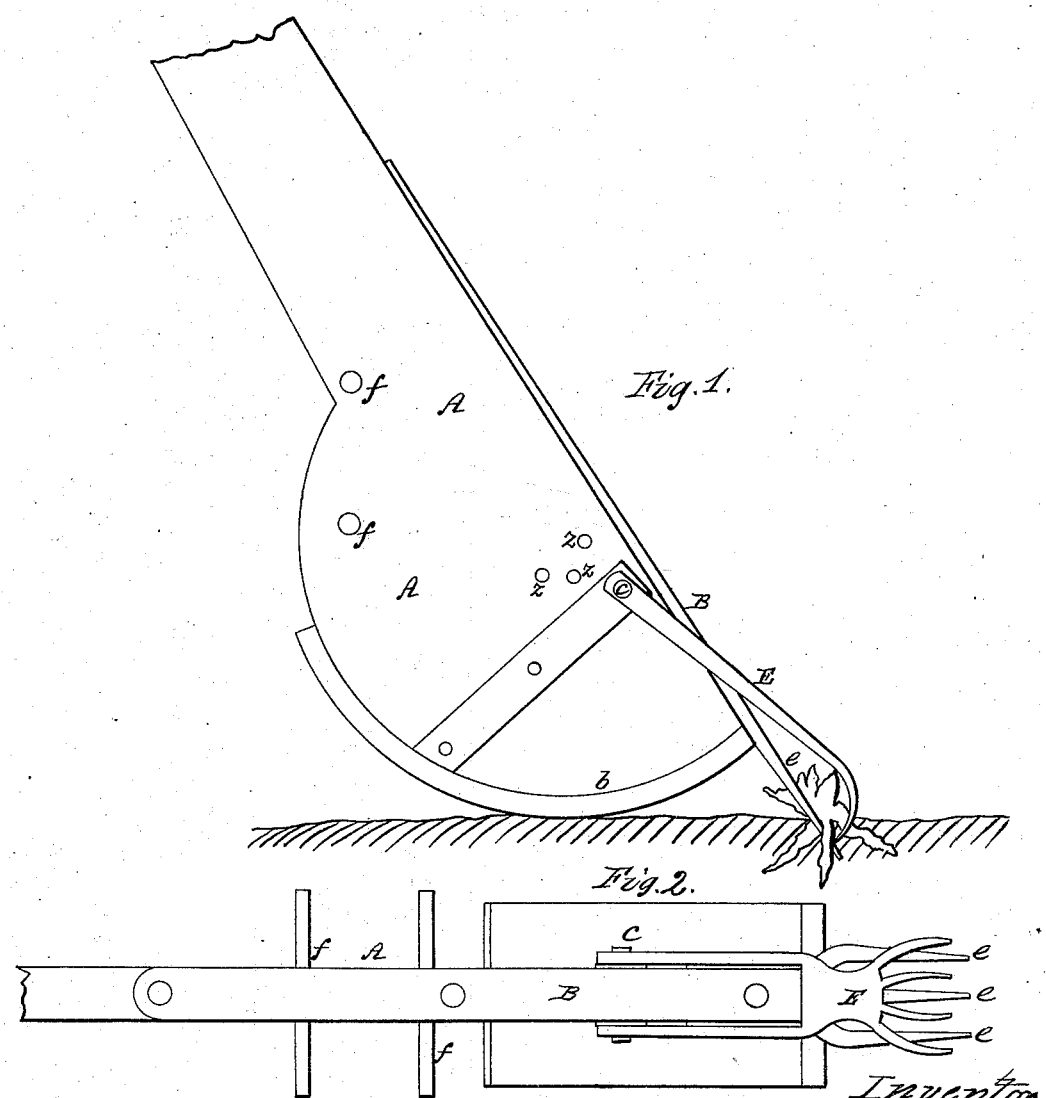

CHARLES R. MOFFETT, OF WILLIAMSTOWN, NEW JERSEY.

IMPROVEMENT IN GRUBBING-MACHINES.

Specification forming part of Letters Patent No. 48,298, dated June 20, 1865.

*To all whom it may concern:*

Be it known that I, CHARLES R. MOFFETT, of Williamstown, Camden county, New Jersey, have invented an Improved Grubbing-Instrument; and I do hereby declare the following to be a full, clear, and exact description of the same, reference being had to the accompanying drawings, and to the letters of reference marked thereon.

My invention consists of a lever with a curved end, from which projects a series of prongs or teeth, in combination with a toothed plate hung to the lever, so that the root to be extracted may be grasped between the teeth of the lever and those of the plate, so as to be withdrawn from the ground on depressing the long arm of the lever.

In order to enable others to make and use my invention, I will now proceed to describe its construction and operation.

On reference to the accompanying drawings, which form a part of this specification, Figure 1 is a side elevation of my improved grubbing-instrument, and Fig. 2 a plan view.

Similar letters refer to similar parts in both views.

A is a lever, the edge of which, near the lower end or head, A', is curved, as shown in the drawings, and to this curved edge is secured a broad curved strip, b, of wood or metal.

From the lower end of the lever project a series of forks or prongs, e, and to a pin, c, passing through the head of the lever is hung a toothed plate, E, the teeth f of the latter coinciding with the spaces between the teeth e at the end of the lever. Through the head A' of the lever pass pins f f, for a purpose described hereinafter.

When the machine has to be used the plate E is turned back against the plate B, the lever is brought to an upright position, and the teeth e are introduced into the ground at the side of the root to be extracted. The plate E is then turned down to the position shown in Fig. 1, so that its teeth may engage with the opposite side of the root to that adjacent to the teeth e, after which the long arm of the lever is depressed, so as to elevate the lower end, and with it the root which is confined between the teeth e and f, the broad plate b affording such a rest for the lever as will prevent the end of the latter from striking into the ground.

The pin c may be passed through any one of a number of openings, x, made in the head of the lever, the plate E being thus so adjusted that its teeth may be made to embrace roots of any desired size.

Should a root adhere with unusual tenacity in the earth, a greater power may be exerted by the operator bearing with his foot on one of the pins f.

I do not desire to claim, broadly, the use in a grubbing-machine of a curved lever; but

I claim as my invention and desire to secure by Letters Patent—

The lever A, with its curved end and prongs or teeth e, combined with the toothed plate E, as and for the purpose described.

In testimony whereof I have signed my name to this specification in the presence of two subscribing witnesses.

CHARLES R. MOFFETT.

Witnesses:
 CHARLES E. FOSTER,
 JOHN WHITE.